(12) United States Patent
Kakishima et al.

(10) Patent No.: US 10,425,852 B2
(45) Date of Patent: Sep. 24, 2019

(54) BASE STATION, MOBILE STATION, REFERENCE SIGNAL TRANSMISSION METHOD, AND CHANNEL QUALITY MEASUREMENT METHOD

(71) Applicant: NTT DOCOMO, INC., Tokyo (JP)

(72) Inventors: Yuichi Kakishima, Tokyo (JP); Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/024,366

(22) PCT Filed: Aug. 22, 2014

(86) PCT No.: PCT/JP2014/071983
§ 371 (c)(1),
(2) Date: Mar. 24, 2016

(87) PCT Pub. No.: WO2015/045696
PCT Pub. Date: Apr. 2, 2015

(65) Prior Publication Data
US 2016/0242060 A1    Aug. 18, 2016

(30) Foreign Application Priority Data
Sep. 26, 2013 (JP) ................................. 2013-200606

(51) Int. Cl.
*H04B 7/06* (2006.01)
*H04B 7/0417* (2017.01)
(Continued)

(52) U.S. Cl.
CPC .......... *H04W 24/10* (2013.01); *H04B 7/0413* (2013.01); *H04B 7/0417* (2013.01);
(Continued)

(58) Field of Classification Search
CPC .................................... H04Q 7/00; H04L 1/92
(Continued)

(56) References Cited

U.S. PATENT DOCUMENTS

| 2012/0120905 A1* | 5/2012 | Ko .................. H04B 7/0413 370/329 |
| 2012/0287875 A1 | 11/2012 | Kim et al. |

(Continued)

OTHER PUBLICATIONS

International Search Report issued in corresponding application No. PCT/JP2014/071983 dated Nov. 18, 2014 (4 pages).
Written Opinion of the International Searching Authority issued in corresponding application No. PCT/JP2014/071983 dated Nov. 18, 2014 (3 pages).
3GPP TS 36.211 V10.7.0, "3rd Generation Partnership Project; Technical Specification Group Radio Access Network; Evolved Universal Terrestrial Radio Access (E-UTRA); Physical Channels and Modulation (Release 10)"; Section 6.10.5; Feb. 2013 (6 pages).
(Continued)

*Primary Examiner* — Iqbal Zaidi
(74) *Attorney, Agent, or Firm* — Osha Liang LLP (57) ABSTRACT

A base station that communicates with a mobile station by using a plurality of antenna ports includes a mapping information communication unit configured to generate mapping of reference signals for measuring channel state information of the antenna ports by combining, within a resource block, mappings of reference signals for measuring the channel state information, the mappings being defined for a predetermined number or less of the antenna ports, and configured to communicate information indicating the generated mapping to the mobile station; a multiplexer configured to multiplex the reference signals for measuring the channel state information in one or more resource elements in the resource block in accordance with the generated mapping; and a transmitter configured to transmit the reference signals for measuring the channel state information.

4 Claims, 9 Drawing Sheets

(51) Int. Cl.
*H04W 72/12* (2009.01)
*H04W 24/10* (2009.01)
*H04W 16/28* (2009.01)
*H04L 5/00* (2006.01)
*H04B 7/0413* (2017.01)

(52) U.S. Cl.
CPC ......... *H04B 7/0626* (2013.01); *H04B 7/0684* (2013.01); *H04L 5/0048* (2013.01); *H04L 5/0057* (2013.01); *H04W 16/28* (2013.01); *H04W 72/1263* (2013.01); *H04L 5/0023* (2013.01)

(58) Field of Classification Search
USPC ...... 370/328–339; 445/82–83; 375/260–267; 455/82–83
See application file for complete search history.

(56) References Cited

U.S. PATENT DOCUMENTS

| | | | |
|---|---|---|---|
| 2014/0011531 A1* | 1/2014 | Burstrom | H04W 72/121 455/509 |
| 2015/0245322 A1* | 8/2015 | Shimezawa | H04L 5/0053 370/329 |
| 2018/0145792 A1* | 5/2018 | Murakami | H04L 1/22 |

OTHER PUBLICATIONS

3GPP TS 36.331 V10.0.0, "3rd Generation Partnership Project; Technical Specification Group Radio Access Network; Evolved Universal Terrestrial Radio Access (E-UTRA); Radio Resource Control (RRC); Protocol specification (Release 10)"; Section 6.3.2; Dec. 2012 (31 pages).

Partial Supplementary European Search Report issued in corresponding European Application No. 14848382.9, dated Jul. 11, 2016 (8 pages).

Office Action Issued in corresponding European Patent Application No. 14848382.9, dated Nov. 17. 2017 (8 pages).

Alcatel-Lucent Shanghai Bell, et al., "Considerations on CSI feedback enhancements for high-priority antenna configurations", 3GPP TSG-RAN WG1 #66, R1-112420, Athens. Greece, Aug. 22-26. 2011 (7 pages).

Office Action issued in the counterpart European Patent Application No. 14848382.9, dated May 24, 2018 (8 pages).

Office Action issued in the counterpart Chinese Patent Application No. 201480052271.X, dated Jul. 24, 2018 (19 pages).

Office Action issued in the related U.S. Appl. No. 15/850,808, dated Aug. 10, 2018 (11 pages).

Extended European Search Report in counterpart European Patent Application No. 14848382.9, dated Oct. 13, 2016 (15 pages).

* cited by examiner

FIG.1

| CSI reference signal configuration | Number of CSI reference signals configured | | | | | |
|---|---|---|---|---|---|---|
| | 1 or 2 | | 4 | | 8 | |
| | $(k', l')$ | $n_2 \bmod 2$ | $(k', l')$ | $n_2 \bmod 2$ | $(k', l')$ | $n_2 \bmod 2$ |
| 0 | (9,5) | 0 | (9,5) | 0 | (9,5) | 0 |
| 1 | (11,2) | 1 | (11,2) | 1 | (11,2) | 1 |
| 2 | (9,2) | 1 | (9,2) | 1 | (9,2) | 1 |
| 3 | (7,2) | 1 | (7,2) | 1 | (7,2) | 1 |
| 4 | (9,5) | 1 | (9,5) | 1 | (9,5) | 1 |
| 5 | (8,5) | 0 | (8,5) | 0 | | |
| 6 | (10,2) | 1 | (10,2) | 1 | | |
| 7 | (8,2) | 1 | (8,2) | 1 | | |
| 8 | (6,2) | 1 | (6,2) | 1 | | |
| 9 | (8,5) | 1 | (8,5) | 1 | | |
| 10 | (3,5) | 0 | | | | |
| 11 | (2,5) | 0 | | | | |
| 12 | (5,2) | 1 | | | | |
| 13 | (4,2) | 1 | | | | |
| 14 | (3,2) | 1 | | | | |
| 15 | (2,2) | 1 | | | | |
| 16 | (1,2) | 1 | | | | |
| 17 | (0,2) | 1 | | | | |
| 18 | (3,5) | 1 | | | | |
| 19 | (2,5) | 1 | | | | |

Frame structure type 1 and 2

| CSI-RS-SubframeConfig | CSI-RS periodicity (subframes) | CSI-RS subframe offset (subframes) |
|---|---|---|
| 0 – 4 | 5 | $I_{CSI-RS}$ |
| 5 – 14 | 10 | $I_{CSI-RS} - 5$ |
| 15 – 34 | 20 | $I_{CSI-RS} - 15$ |
| 35 – 74 | 40 | $I_{CSI-RS} - 35$ |
| 75 – 154 | 80 | $I_{CSI-RS} - 75$ |

BASE STATION, MOBILE STATION, REFERENCE SIGNAL TRANSMISSION METHOD, AND CHANNEL QUALITY MEASUREMENT METHOD

TECHNICAL FIELD

The present invention relates to a base station, a mobile station, a reference signal transmission method, and a channel quality measurement method.

BACKGROUND ART

Assuming that a plurality of antenna ports (AP: Antenna Port) of a base station is arranged in a transverse direction, a technique for executing beam forming in the horizontal direction has been adopted for Releases 8 to 11 of the Third Generation Partnership Project (3GPP) standards.

For Release 12 of the 3GPP standard, three-dimensional MIMO (3D-MIMO: Three Dimensional Multiple Input Multiple Output) has been studied such that multiple antenna elements, which are two-dimensionally arranged in the vertical direction and horizontal direction, are installed in a base station, and a beam is formed in the vertical direction, in addition to the horizontal direction. It can be expected that system characteristics can be enhanced by forming a beam in the vertical direction and horizontal direction.

For purposes of 3GPP standardization, the 3D-MIMO for a case where the number of the antenna ports is less than or equal to 8 is referred to as vertical beam forming, and the 3D-MIMO for a case where the number of the antenna ports is greater than 8 (e.g., 16, 32, 64, . . . ) is referred to as Full Dimension-MIMO (FD-MIMO). FD-MIMO is often referred to as "Massive MIMO."

Massive MIMO can improve frequency utilization efficiency by forming a sharp beam by using a great number of antenna elements of a base station.

Figure 1:
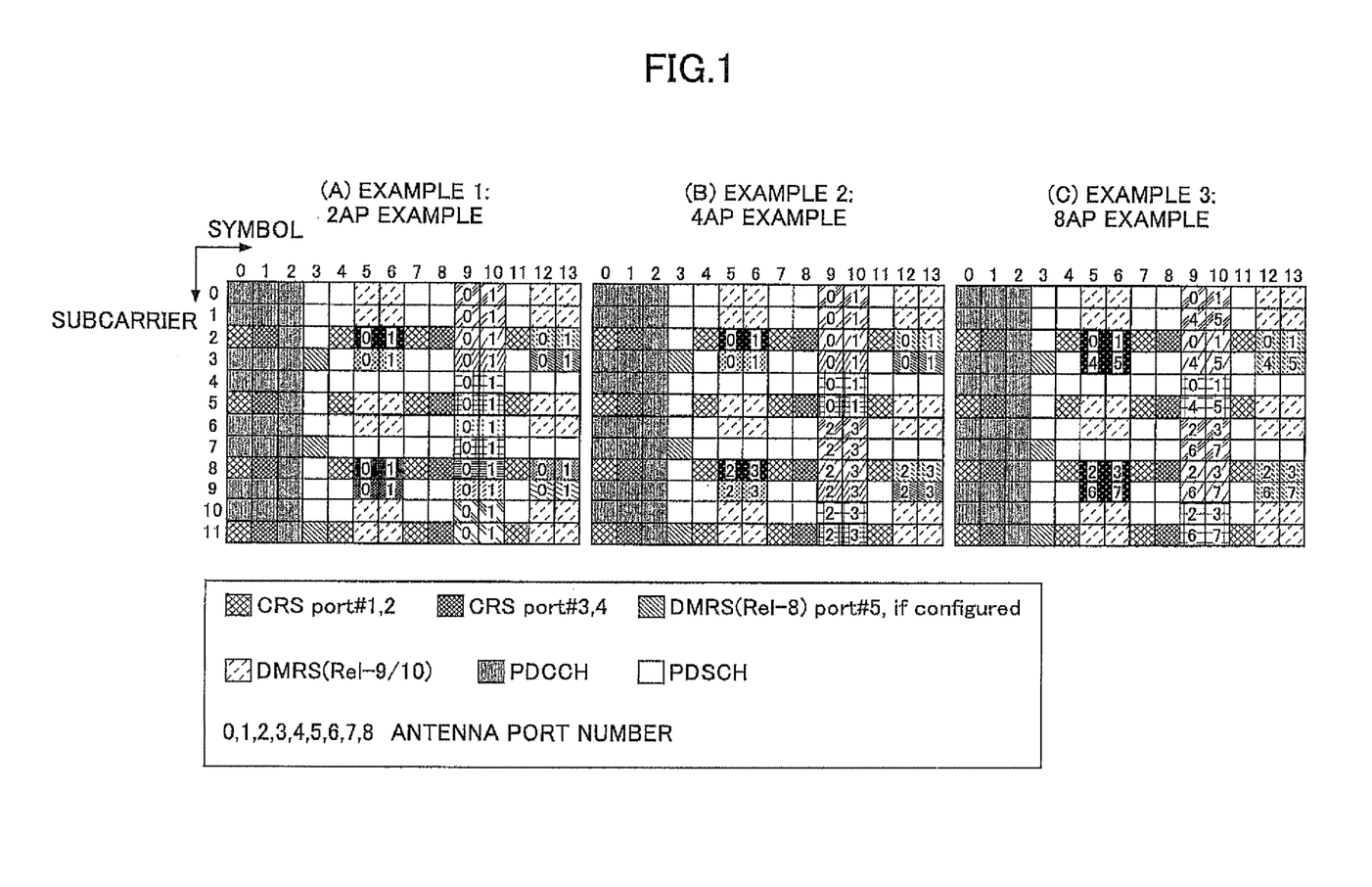
FIG. 1 shows an example of mapping of a CSI-RS for a case of less than or equal to eight antenna ports.

Furthermore, reference signals (CSI-RS: Reference Signal for CSI measurement) for measuring channel state information (CSI: Channel State Information) for a case where the number of the antenna ports is less than or equal to 8 has been specified in Release 10 of the 3GPP standard (cf. 3GPP TS 36.211 V10.7.0 (2013-02) Sec 6.10.5 and 3GPP TS 36.331 V10.0.0 (2013-06) Sec 6.3.2). FIG. 1 shows an example of mapping of the CSI-RS for the case where the number of the antenna ports is less than or equal to 8. To reduce the overhead of the CSI-RS, in a frequency domain, one resource element (RE: Resource Element) is allocated per one antenna port in one resource block (RB: Resource Block). Additionally, in a time domain, the CSI-RS is transmitted with a transmission period of 5, 10, 20, 40, or 80 milliseconds. The transmission period of the CSI-RS is set by Radio Resource Control (RRC) signaling.

Figure 2:
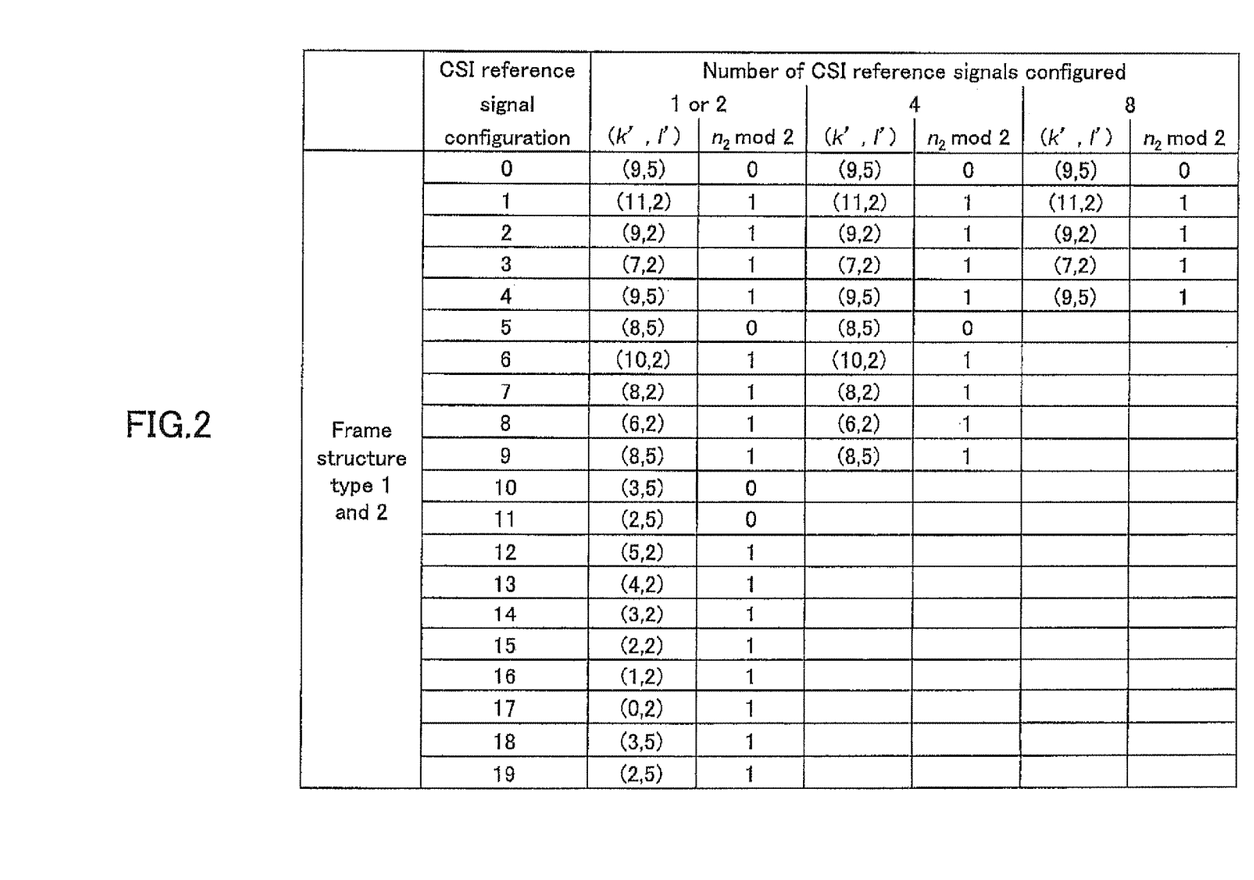
FIG. 2 shows an example of a table that is used for specifying a resource configuration of the CSI-RS.

To signal, to a mobile station, the mapping of the CSI-RS onto resource elements within a resource block, a table (CSI-RS configuration) that is shown in FIG. 2 is used (cf. Table 6.10.5.2-1 of Sec 6.10.5 of 3GPP TS 36.211 V10.7.0 (2013-02)). FIG. 2 shows an example of a table that is used for specifying a resource configuration of the CSI-RS.

For example, for a case where the number of the antenna ports is 2, there are twenty types of CSI-RS mapping, which are shown in (A) of FIG. 1. To signal, to a mobile station, which one of the twenty types of the mapping is to be used, one of the indexes from 0 to 19 (CSI reference signal configuration) in the table of FIG. 2 is used.

Figure 3:
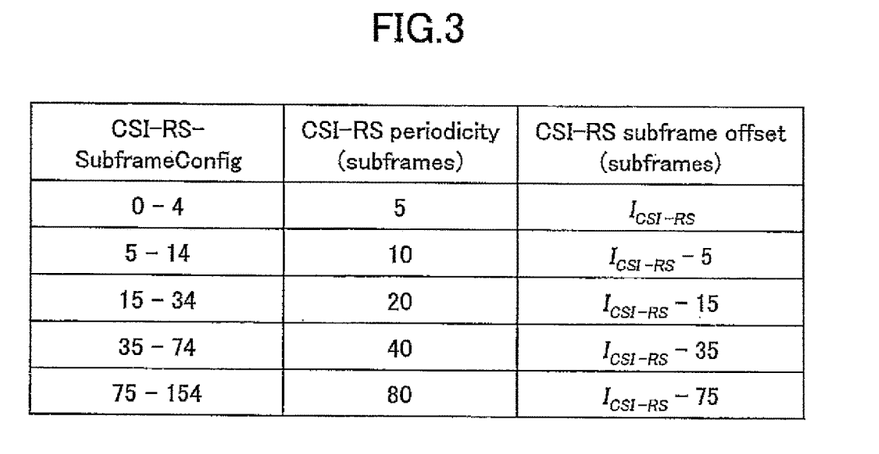
FIG. 3 shows an example of a table that is used for specifying a subframe configuration of the CSI-RS.

Additionally, to signal, to a mobile station, the transmission period of the CSI-RS and a start position of a subframe (a subframe offset), a table that is shown in FIG. 3 (CSI-RS subframe configuration) is used (cf. Table 6.10.5.3-1 of Sec 6.10.5 of 3GPP TS 36.211 V10.7.0 (2013-02)). FIG. 3 shows an example of a table that is used for specifying a subframe configuration of the CSI-RS.

The CSI-RS that is specified by using the table of FIG. 2 is transmitted with a period of 5, 10, 20, 40, or 80 milliseconds, while the CSI-RS is multiplexed in the subframe. To specify the period and the start position of the subframe, one of the indexes from 0 to 154 in the table of FIG. 3 (CSI RS-SubframeConfig) is signaled to the mobile station.

SUMMARY OF THE INVENTION

Technical Problem to be Solved

As described above, the CSI-RS that is specified by Release 10 of the 3GPP standard supports up to eight antenna ports. However, in order to implement channel quality measurement for the FD-MIMO, it may be required to support an extended number of the antenna ports, such as 16, 32, 64, and so forth.

An object of the present invention is to achieve CSI-RS configurations that can support an extended number of the antenna ports.

Means for Solving the Problem

A base station according to an embodiment of the present invention is the base station configured to communicate with a mobile station by using a plurality of antenna ports, wherein the base station includes a mapping information communication unit configured to generate mapping of reference signals for measuring channel state information of the antenna ports by combining, within a resource block, mappings of reference signals for measuring the channel state information, the mappings being defined for a predetermined number or less of the antenna ports, and configured to communicate information indicating the generated mapping to the mobile station; a multiplexer configured to multiplex the reference signals for measuring the channel state information in one or more resource elements in the resource block in accordance with the generated mapping; and a transmitter configured to transmit the reference signals for measuring the channel state information.

Further, a base station according to an embodiment of the present invention is the base station configured to communicate with a mobile station by using a plurality of antenna ports, wherein the base station includes a mapping information communication unit configured to generate mapping of reference signals for measuring channel state information of the antenna ports by dividing the antenna ports into a predetermined number of groups based on a number of reference antenna ports and by using mapping of reference signals for measuring the channel state information, the mapping being defined for the reference antenna ports, for reference signals for measuring the channel state information for the group that is different depending on a subframe or a resource block, and configured to communicate information indicating the generated mapping to the mobile station; a multiplexer configured to multiplex the reference signals for measuring the channel state information in the subframe or the resource block in accordance with the generated mapping; and a transmitter configured to transmit the reference signals for measuring the channel state information.

A mobile station according to an embodiment of the present invention is the mobile station configured to communicate with a base station including a plurality of antenna ports, wherein the mobile station includes a mapping information receiver configured to receive information indicating mapping of reference signals for measuring channel state information of the antenna ports, the mapping being generated by combining, within a resource block, mappings of reference signals for measuring the channel state information, the mappings being defined for a predetermined number or less of the antenna ports; a reference signal extraction unit configured to extract the reference signals for measuring the channel state information based on the received information indicating the mapping; a channel state information generator configured to generate the channel state information by using the extracted reference signals; and a transmitter configured to transmit the generated channel state information.

Further, a mobile station according to an embodiment of the present invention is the mobile station configured to communicate with a base station including a plurality of antenna ports, wherein the mobile station includes a mapping information receiver configured to receive information indicating mapping of reference signals for measuring channel station information of the antenna ports, wherein the mapping is generated by dividing the antenna ports into a predetermined number of groups based on a number of reference antenna ports and by using mapping of reference signals for measuring the channel state information, the mapping being defined for the reference antenna ports, for reference signals for measuring the channel state information for the group that is different depending on a subframe or a resource block; a reference signal extraction unit configured to extract the reference signals for measuring the channel state information based on the received information indicating the mapping; a channel state information generator configured to generate the channel state information by using the extracted reference signals; and a transmitter configured to transmit the generated channel state information.

A reference signal transmission method according to an embodiment of the present invention is the reference signal transmission method by a base station configured to communicate with a mobile station by using a plurality of antenna ports, wherein the method includes a step of generating mapping of reference signals for measuring channel state information of the antenna ports by combining, within a resource block, mappings of reference signals for measuring the channel state information, the mappings being defined for a predetermined number or less of the antenna ports, and communicating information indicating the generated mapping to the mobile station; a step of multiplexing the reference signals for measuring the channel state information in one or more resource elements in the resource block in accordance with the generated mapping; and a step of transmitting the reference signals for measuring the channel state information.

Further, a reference signal transmission method according to an embodiment of the present invention is the reference signal transmission method by a base station configured to communicate with a mobile station by using a plurality of antenna ports, wherein the method includes a step of generating mapping of reference signals for measuring channel state information of the antenna ports by dividing the antenna ports into a predetermined number of groups based on a number of reference antenna ports and by using mapping of reference signals for measuring the channel state information, the mapping being defined for the reference antenna ports, for reference signals for measuring the channel state information for the group that is different depending on a subframe or a resource block, and communicating information indicating the generated mapping to the mobile station; a step of multiplexing the reference signals for measuring the channel state information in the subframe or the resource block in accordance with the generated mapping; and a step of transmitting the reference signals for measuring the channel state information.

A channel quality measurement method according to an embodiment of the present invention is the channel quality measurement method by a mobile station configured to communicate with a base station including a plurality of antenna ports, wherein the method includes a step of receiving information indicating mapping of reference signals for measuring channel state information of the antenna ports, the mapping being generated by combining, within a resource block, mappings of reference signals for measuring the channel state information, the mappings being defined for a predetermined number or less of the antenna ports; a step of extracting the reference signals for measuring the channel state information based on the received information indicating the mapping; and a step of measuring the channel quality by using the extracted reference signals.

Further, a channel quality measurement method according to an embodiment of the present invention is a channel quality measurement method by a mobile station configured to communicate with a base station including a plurality of antenna ports, wherein the method includes a step of receiving information indicating mapping of reference signals for measuring channel station information of the antenna ports, wherein the mapping is generated by dividing the antenna ports into a predetermined number of groups based on a number of reference antenna ports and by using mapping of reference signals for measuring the channel state information, the mapping being defined for the reference antenna ports, for reference signals for measuring the channel state information for the group that is different depending on a subframe or a resource block; a step of extracting the reference signals for measuring the channel state information based on the received information indicating the mapping; and a step of measuring the channel quality by using the extracted reference signals.

Advantageous Effect of the Invention

According to the present invention, CSI-RS configurations can be achieved that can support an extended number of the antenna ports.

EMBODIMENTS TO CARRY OUT THE INVENTION

In embodiments of the present invention, a base station (eNB: evolved Node B) having a plurality of antenna ports, more specifically, a base station for implementing a CSI-RS configuration that can support an extended number of antenna ports (a number of antenna ports greater than 8) is described. Additionally, a mobile station (UE: User Equipment) that communicates with a base station having a plurality of antenna ports, more specifically, a mobile station for implementing channel quality measurement by using the CSI-RS that can support the extended number of antenna ports is described.

Note that the CSI-RS is reference signals that are used for measuring channel state information (CSI), such as a Channel Quality Indicator (CQI), a Precoding Matrix Indicator (PMI), and a Rank Indicator (RI). Further, an antenna port is a set of one or more antenna elements for transmitting reference signals. There are cases where one antenna port corresponds to one antenna element, and there are cases where one antenna port corresponds to a plurality of antenna elements.

In the embodiment of the present invention, for designing the CSI-RS that can support the extended number of the antenna ports, the following design concept is considered.

(A) Various Numbers of Antenna Ports are to be Supported

For example, it is desired that not only numbers of antenna ports, such as 16, 32, and 64, but also the numbers of antenna ports, such as 10, 12, 16, 24, 32, 36, 48, 64, 96, and 128 can be supported.

(B) Resource Elements that are to be Allocated to Respective Antenna Ports are to be Proximate in Time and in Frequency This is to minimize channel variation in time and frequency directions and an effect of incompleteness of a Radio Frequency (RF) device.

(C) To be Coarsely Multiplexed in Time

This is to minimize time for a mobile station to wake up from a sleep mode, and to save battery energy consumption.

(D) Reduction of Overhead

This is to reduce an effect on the throughput, so that an effect on a mobile station that may not execute signaling of reference signals, such as a mobile station that conforms to a legacy release of the 3GPP standard (e.g., 8-11), is to be reduced.

In the embodiment of the present invention, while considering these points, configurations of the CSI-RS that can support the extended number of the antenna ports can be achieved by any of the following methods.

(1) A Method of Newly Defining Mapping of the CSI-RS for the Extended Number of the Antenna Ports For example, if the number of the antenna ports is 16, in addition to the mapping of the CSI-RS for the antenna port numbers from 0 to 7 (cf. (C) of FIG. 1), which is defined in Release 10 of the 3GPP standard, mapping of the CSI-RS for antenna port numbers from 8 to 15 is newly defined. A base station multiplexes the CSI-RS in one or more resource elements in a resource block in accordance with the newly defined mapping.

(2) A Method of Combining Mappings that are Defined in Release 10 of the 3GPP Standard For example, if the number of the antenna ports is 16, mapping of the CSI-RS corresponding to the extended number of the antenna ports is generated by combining, within a resource block, two mappings of the CSI-RS for the antenna port numbers from 0 to 7 (cf. (C) of FIG. 1), where each of the two mappings is defined in Release 10 of the 3GPP standard. In order to indicate the mapping of the CSI for the antenna port numbers from 0 to 7 and the mapping of the CSI for the antenna port numbers from 8 to 15, two indexes of the table of FIG. 2 (CSI reference signal configuration) may be used. A base station signals information indicating the generated mapping to a mobile station, and the base station also multiplexes the CSI-RS in one or more resource elements in a resource block in accordance with the generated mapping.

(3) A Method of Switching the Mapping of the CSI-RS that is Defined in Release 10 of the 3GPP Standard in Unit of Subframe or in Unit of Resource Block For example, if the number of the antenna ports is 16, the mapping of the CSI-RS for the eight antenna ports (cf. (C) of FIG. 1) is used as reference mapping. The antenna port numbers from 0 to 15 are divided into the antenna port numbers from 0 to 7 and the antenna port numbers from 8 to 15. By using, depending on a subframe or a resource block, the reference mapping of the CSI-RS for the antenna port numbers from 0 to 7 for the CSI-RS for the antenna port numbers from 0 to 7, or for the CSI-RS for the antenna port numbers from 8 to 15, mapping of the CSI-RS corresponding to the extended number of the antenna ports is generated. It can be defined on a system how to allocate a group of antenna ports to a subframe or to a resource block. A base station signals information indicating the generated mapping to a mobile station. The base station also multiplexes the CSI-RS in a resource block in accordance with the generated mapping.

The methods are described in detail below, by referring to the drawings.

Figure 4:
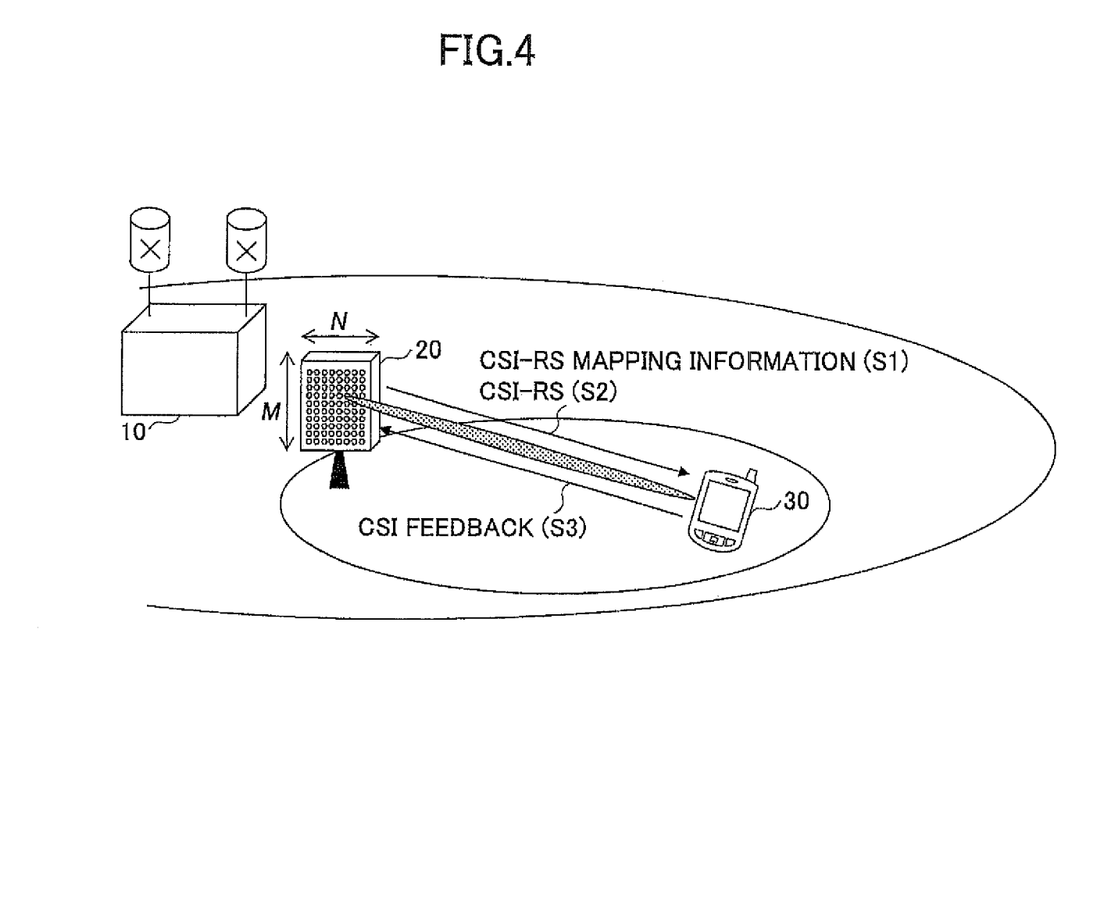
FIG. 4 is a schematic diagram of a radio communication system according to an embodiment of the present invention.

(1) The Method of Newly Defining the Mapping of the CSI-RS for the Extended Number of the Antenna Ports FIG. 4 is a schematic diagram showing a radio communication system according to an embodiment of the present invention. The radio communication system includes a macro base station 10 that covers a wide range; a FD-MIMO station 20 that is located in the area of or in the vicinity of the area of the macro base station 10, and that includes two-dimensionally arranged antenna elements; and a mobile station 30. It is assumed that the FD-MIMO station 20 includes more than eight antenna elements. The more than eight antenna elements are classified as more than 8 antenna ports. As described above, one antenna element may correspond to one antenna port, and a plurality of antenna elements may correspond to one antenna port. In FIG. 4, the macro base station 10 and the FD-MIMO station 20 are separately arranged. However, the macro base station 10 may be configured as an FD-MIMO station having more than eight antenna elements. Further, it is described that the FD-MIMO station 20 includes two-dimensionally arranged antenna elements. However, the FD-MIMO station 20 may include one-dimensionally arranged antenna elements or three-dimensionally arranged antenna elements.

The FD-MIMO station 20 generates mapping of a CSI-RS corresponding to the extended number of the antenna ports, and the FD-MIMO station 20 transmits the mapping information of the CSI-RS to the mobile station 30 (S1). For example, the FD-MIMO station 20 may transmit, to the mobile station 30, a number of the antenna ports; and an index indicating the mapping of the CSI-RS (CSI reference signal configuration). The example of the mapping is described below by referring to FIG. 5. Further, the FD-MIMO station 20 multiplexes the CSI-RS in one or more resource elements in a resource block in accordance with the generated mapping, and the FD-MIMO station 20 transmits the CSI-RS to the mobile station 30 (S2). The mobile station 30 can extract the CSI-RS in accordance with the mapping information of the CSI-RS. The mobile station 30 measures channel quality by using the CSI-RS; generates the CSI; and transmits the CSI to the FD-MIMO station 20 (S3).

Figure 5:
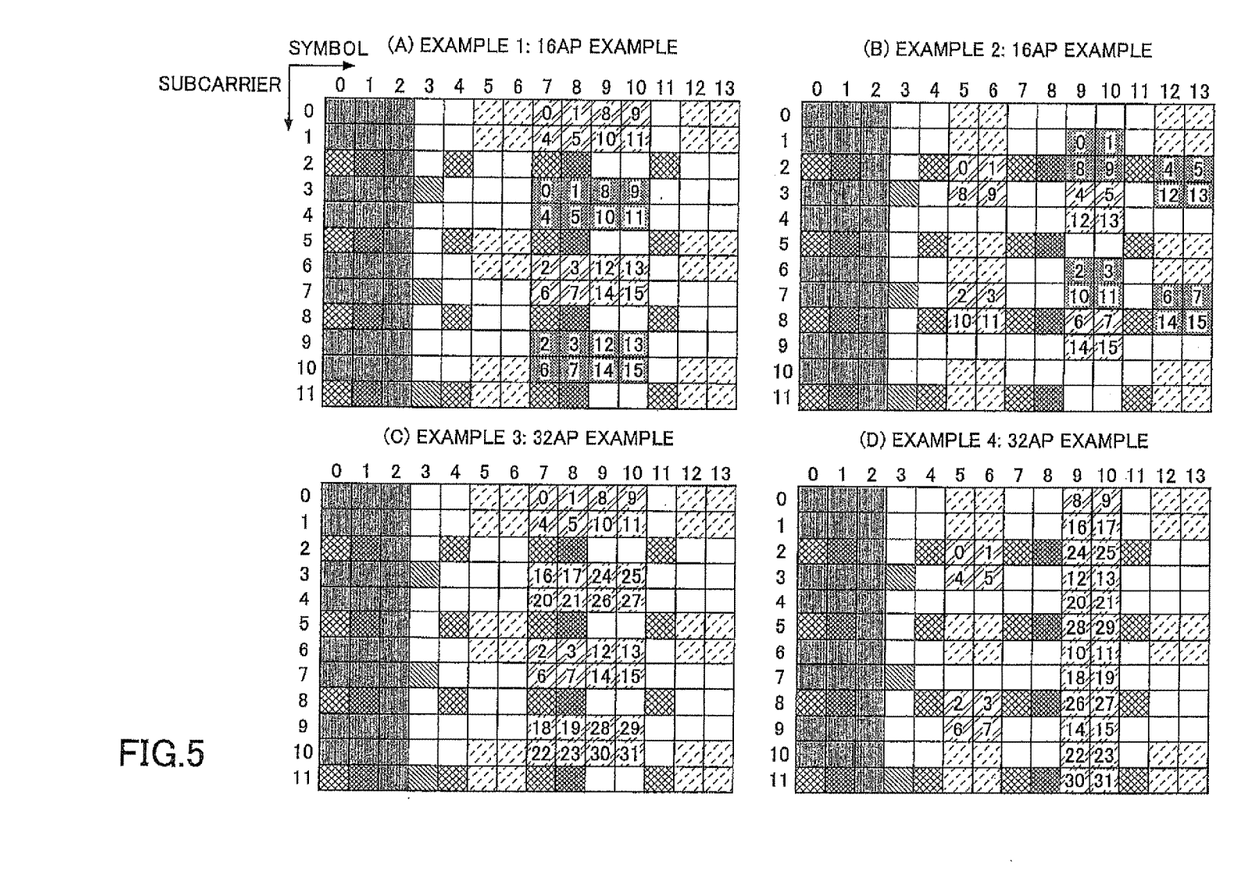
FIG. 5 shows examples of mapping of the CSI-RS.

An example of the mapping of the CSI-RS for a case where the number of the antenna ports is 16 is shown in (A) of FIG. 5.

Even for a case where number of the antenna ports is 16, the mapping of the CSI-RS is generated similar to the case where the number of antenna ports is 8. As shown in (C) of FIG. 1, for a case where a number of antenna ports is 8, the CSI-RS for antenna port numbers (0,1) is continuously allocated in a single subcarrier, and the CSI-RS for antenna port numbers (4, 5) is continuously allocated in the next subcarrier. Furthermore, at symbol positions that are the same as the symbol positions of the CSI-RS for the antenna port numbers (0, 1), the CSI-RS for antenna port numbers (2, 3) is continuously allocated in a single subcarrier, and the CSI-RS for antenna port numbers (6, 7) is continuously allocated in the next subcarrier.

For the case where the number of the antenna ports is 16, for example, the above-described allocation of the CSI-RS of the antenna port numbers (0, 1, 4, 5) and the numbers (2, 3, 6, 7) is extended for the CSI-RS for the antenna port numbers from 8 to 15. Specifically, the CSI-RS for the antenna port numbers (8, 9) is continuously allocated at symbols that are next to the CSI-RS for the antenna port numbers (0, 1). Then, the CSI-RS for the antenna port numbers (10, 11) is continuously allocated in a subcarrier that is next to the CSI-RS for the antenna port numbers (8, 9). Furthermore, the CSI-RS for the antenna port numbers (12, 13) is continuously allocated at symbols that are next to the CSI-RS for the antenna port numbers (2, 3). Then, the CSI-RS for the antenna port numbers (14, 15) is continuously allocated in a subcarrier that is next to the CSI-RS for the antenna port numbers (12, 13).

Note that the mapping of the CSI-RS for the case where the number of the antenna ports is 16 is not limited to the mapping shown in (A) of FIG. 5. By considering the above-described design concept (A)-(D), the CSI-RS may be allocated as shown in (B) of FIG. 5.

An example of the mapping of the CSI-RS for a case where the number of the antenna ports is 32 is shown in (C) of FIG. 5.

Similarly, for the case where the number of the antenna ports is 32, the allocation of the CSI-RS for the antenna port numbers (0, 1, 4, 5) and (2, 3, 6, 7) for the case where the number of the antenna ports is 8 is extended for the CSI-RS for the antenna port numbers from 8 to 31.

Specifically, similar to the case where the number of the antenna ports is 16, the CSI-RS for the antenna port numbers from 0 to 15 is allocated. Then, the CSI-RS for the antenna port numbers (16, 17) is continuously allocated in a single subcarrier at symbol positions that are the same as the symbol positions of the CSI-RS for the antenna port numbers (0, 1), and the CSI-RS for the antenna port numbers (20, 21) is continuously allocated in the next subcarrier. Further, the CSI-RS for the antenna port numbers (24, 25) is continuously allocated at symbols that are next to the CSI-RS for the antenna port number (16, 17). Then, the CSI-RS for the antenna port numbers (26, 27) is continuously allocated in the subcarrier that is next to the CSI-RS for the antenna port numbers (24, 25). Similarly, the CSI-RS for the antenna port numbers (18, 19) is continuously allocated in a single subcarrier at symbol positions that are the same as the symbol positions of the CSI-RS for the antenna port numbers (0, 1), and the CSI-RS for the antenna port numbers (22, 23) is continuously allocated in the next subcarrier. Further, the CSI-RS for the antenna port numbers (28, 29) is continuously allocated at symbols that are next to the CSI-RS for the antenna port number (18, 19). Then, the CSI-RS for the antenna port numbers (30, 31) is continuously allocated in the subcarrier that is next to the CSI-RS for the antenna port numbers (28, 29).

Note that the mapping of the CSI-RS for the case where the number of the antenna ports is 32 is not limited to the mapping shown in (B) of FIG. 5. By considering the above-described design concept (A)-(D), the CSI-RS may be allocated at different resource elements.

According to the allocations of the CSI-RS of (A) of FIG. 5 through (C) of FIG. 5, even if the number of the antenna ports is increased, by using the positional relationship of the CSI-RS for the case where the number of the antenna ports is 8, simplification of channel estimation at a mobile station can be attempted, and at the same time, a deviation of antenna estimation accuracy due to a difference in the number of antenna ports can be reduced.

However, in the method that is shown in (A) of FIG. 5 through (C) of FIG. 5, the CSI-RS is allocated to resource elements for a Physical Downlink Shared Channel (PDSCH). By considering the likelihood that another reference signal or physical channel is multiplexed in these resource elements, even if the number of the antenna ports exceeds 8, the CSI-RS may be mapped so that the resource elements for the CSI-RS for the antenna port numbers from 0 to 7, which are shown in FIG. 1, are to be used. An example of the mapping of the CSI-RS for a case where the number of the antenna ports is 32 is shown in (D) of FIG. 5.

As shown in (C) of FIG. 1, for the case where the number of antenna ports is 8, there are five types of mappings. Namely, 8×5=40 resource elements can be used as the CSI-RS. As shown in (D) of FIG. 5, the CSI-RS for the antenna port numbers 0 to 31 may be allocated to these resource elements.

Further, according to the method that is shown in (A) of FIG. 5 through (C) of FIG. 5, the overhead of the CSI-RS increases, as the number of the antenna ports increases. For example, for a case where the number of the antenna ports is 64, the overhead of a Physical Uplink Control Channel (PUCCH), a Cell-specific Reference Signal (CRS), a Demodulation Reference Signal (DM-RS), and the CSI-RS can be 83%. In this case, there is almost no region for transmitting a data signal in the resource block in which the CSI-RS is included. Thus, mapping of the CSI-RS may be defined with an assumption that no data signal is to be transmitted in the resource block. For example, the CSI-RS may be allocated to resource elements to which the DM-RS is to be allocated (DMRS (Rel-9/10) in FIG. 1); resource elements to which the CRS for antenna portion numbers 3 and 4 is to be allocated (CRS port #3, 4 in FIG. 1); the DM-RS for Release 8 (DMRS (Rel-8) port #5 in FIG. 1), and so forth.

In FIG. 5, the CSI-RS is multiplexed in the resource elements by Frequency Division Multiplexing (FDM) and Time Division Multiplexing (TDM). However, the CSI-RS may be multiplexed by combining these with Code Division Multiplexing (CDM). For example, the CSI-RS for an antenna port may be code division multiplexed with the CSI-RS for another antenna port, and these may be multiplexed in resource elements that are reserved for the CSI-RS.

Next, configurations of the base station (FD-MIMO station) 20 and the mobile station 30 are described.

Figure 6:
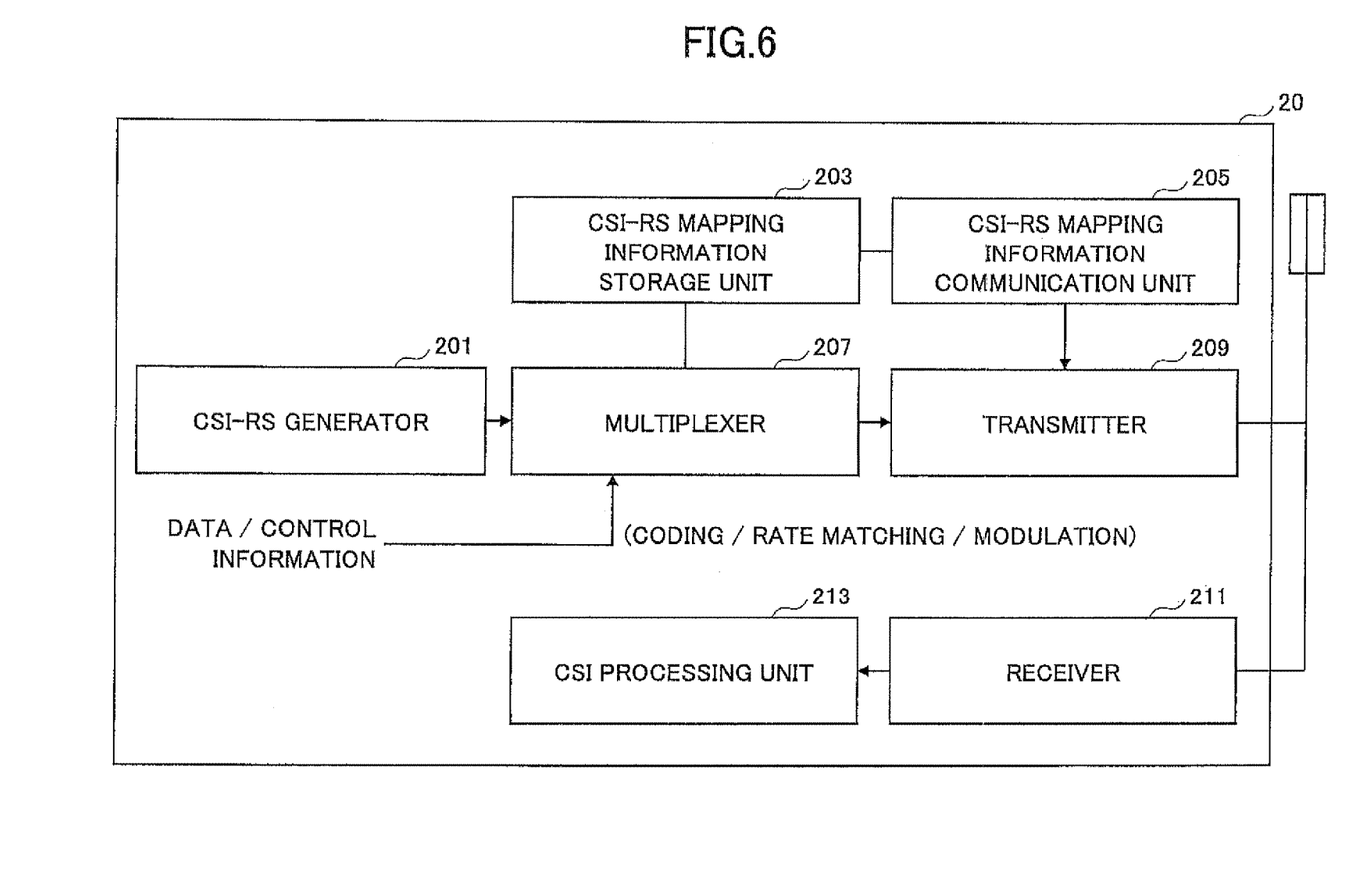
FIG. 6 is a block diagram of a base station according to the embodiment of the present invention.

FIG. 6 shows a block diagram of the base station 20 according to the embodiment of the present invention. The base station 20 includes a CSI-RS generator 201; a CSI-RS mapping information storage unit 203; a CSI-RS mapping information communication unit 205; a multiplexer 207; a transmitter 209; a receiver 211; and a CSI processing unit 213.

The CSI-RS generator 201 generates reference signals for measuring channel state information (CSI-RS).

The CSI-RS mapping information storage unit 203 stores mapping information that indicates, in which resource elements in a resource block, the CSI-RS is to be multiplexed. The CSI-RS mapping information storage unit 203 stores, for example, the mapping information, such as shown in (A) of FIG. 5 through (D) of FIG. 5.

The CSI-RS mapping information communication unit 205 signals, to a mobile station, information indicating the mapping of the CSI-RS. For example, for a case where two types of mapping information are defined on a system, such as the case of the 16-antenna ports of (A) of FIG. 5, the CSI-RS mapping information communication unit 205 may signal, to a mobile station, information indicating antenna port numbers and indexes indicating the mappings of the CSI-RS (CSI reference signal configurations).

The multiplexer 207 multiplexes the CSI-RS in resource elements in a resource block, in accordance with the mapping information that is stored in the CSI-RS mapping information storage unit 203. Additionally, data, control information, and so forth are multiplexed in the resource elements in the resource block, after encoding, rate matching, modulation, and the like are applied to them.

Note that, because of the CSI-RS for the extended antenna ports, resource elements that are allocated to the PDSCH and the like are to be used for the CSI-RS. For example, a mobile station that conforms to Release 12 of the 3GPP standard can recognize the newly defined mapping of the CSI-RS by signaling from a base station. Thus, the multiplexer 207 can multiplex the PDSCH, while avoiding the CSI-RS. By applying, in a rate matching unit (not depicted) of the base station 20, rate matching to the data and the control information in response to the mapping of the CSI-RS, deterioration of the characteristics of the data and the control information can be reduced. Whereas, mobile stations that conform to Releases 8 through 11 of the 3GPP standard may not recognize the newly defined mapping of the CSI-RS. Thus, the multiplexer 207 may apply puncturing.

The transmitter 209 transmits a signal to a mobile station. Especially, the transmitter 209 transmits, to a mobile station, information indicating mapping of the CSI-RS; and the transmitter 209 also transmits, to the mobile station, the CSI-RS that is multiplexed in resource elements in a resource block, together with data and control information, for example.

The receiver 211 receives signals from a mobile station. Especially, the receiver 211 receives the CSI from a mobile station.

The CSI processing unit 213 uses the received CSI; and the CSI processing unit 213 utilizes the received CSI for scheduling for transmitting data to a mobile station, for example.

Figure 7:
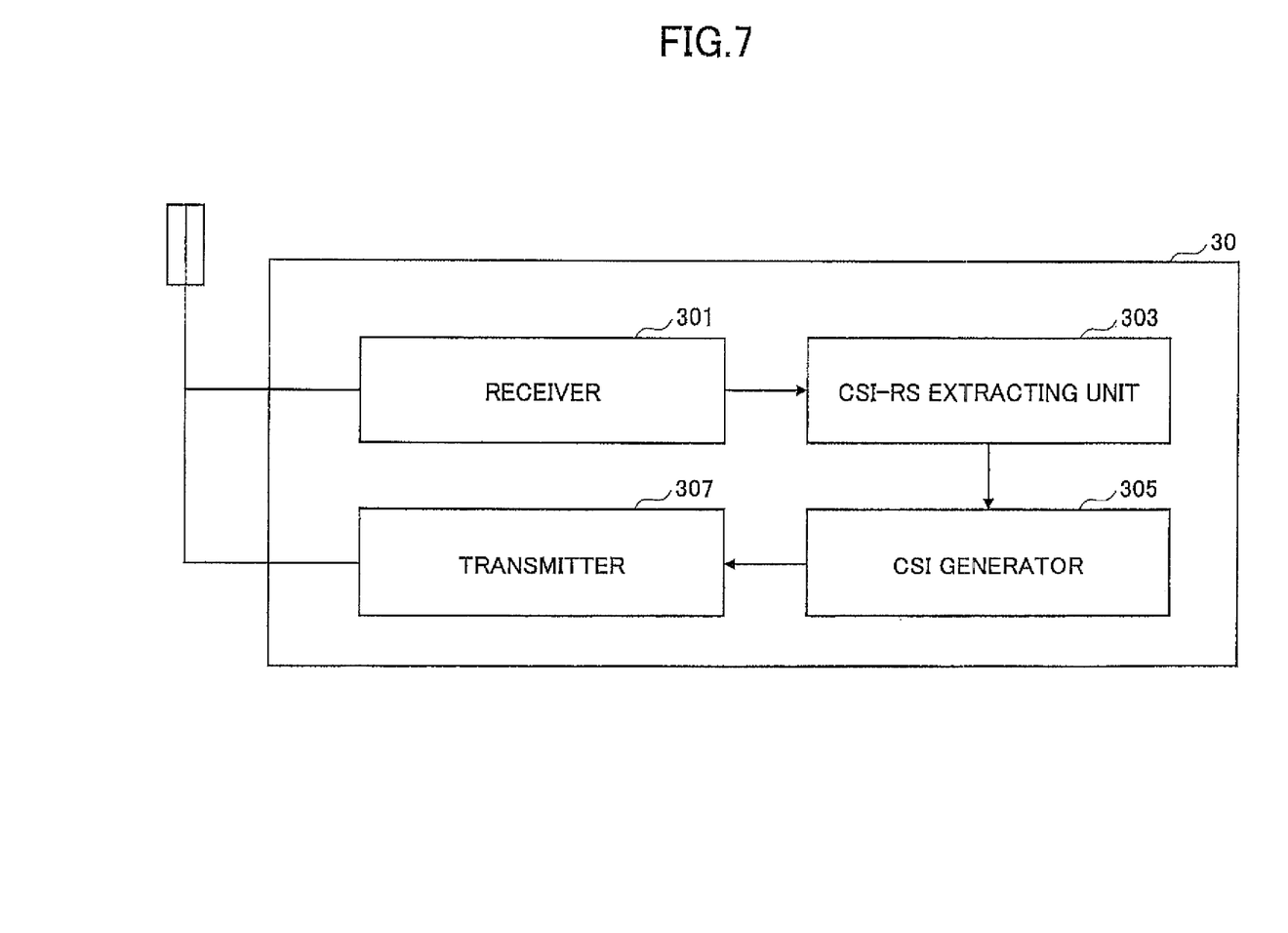
FIG. 7 is a block diagram of a mobile station according to the embodiment of the present invention.

The mobile station 30 includes a receiver 301; a CSI-RS extracting unit 303; a CSI generator 305; and a transmitter 307.

The receiver 301 receives mapping information that is signaled from a base station. Additionally, the receiver 301 receives the CSI-RS, data, control information, and so forth that are multiplexed in resource elements in a resource block.

The CSI-RS extracting unit 303 extracts CSI-RS based on mapping information that is signaled from a base station.

The CSI generator 305 measures channel quality by using the extracted CSI-RS; and the CSI generator 305 generates a CQI that indicates the channel quality; a PMI that indicates a precoding matrix; and a RI that indicates a number of signal sequences.

The transmitter 307 transmits the generated CSI to a base station.

(2) The Method of Combining Mappings that are Defined in Release 10 of the 3GPP Standard For this method, the radio communication system is configured similar to FIG. 4. However, the mapping of the CSI-RS corresponding to the extended number of the antenna ports is generated by combining mappings of the CSI-RS that are defined for a predetermined number or less of the antenna ports, which are shown in FIG. 1.

For example, for a case where the number of the antenna ports is 32, by combining four mappings for 8-antenna ports, which are shown in (C) of FIG. 1, the CSI-RS for 32 antenna ports can be obtained. For a case of 8-antenna ports, five types of mappings of the CSI-RS, which are indicated by indexes from 0 to 4 (CSI reference configurations), are available. For example, by using 0 to 3 of these indexes, the CSI-RS for 32 antenna ports can be obtained. Thus, the FD-MIMO station 20 may signal, to the mobile station 30, two bits that indicate the number of the antenna ports, and the indexes 0, 1, 2, and 3 in the table of FIG. 2. Here, the indexes 0, 1, 2, and 3 may be signaled as individual four indexes, or the indexes 0, 1, 2, and 3 may be signaled as an interval of (0, 3).

The relationship between the indexes to be signaled and the antenna ports may be explicitly signaled to the mobile station 30, or the relationship may follow a predetermined rule. For example, the following information may be signaled to the mobile station 30: the index 0 in the table of FIG. 2 is allocated to the antenna port numbers from 0 to 7; the index 1 is allocated to the antenna port numbers from 8 to 15; the index 2 is allocated to the antenna port numbers from 16 to 23; and the index 3 is allocated to the antenna port numbers from 24-31. Alternatively, a rule may be defined, in advance, in the base station 20 and the mobile station 30 such that the indexes 0, 1, 2, and 3 are allocated to the antenna port numbers from 0 to 7; from 8 to 15; from 16 to 23; and from 24 to 31, in this order.

For example, for a case where the number of the antenna ports is 10, the CSI-RS for 10-antenna ports can be obtained by combining the mapping for 2-antenna ports, which is shown in (A) of FIG. 1; and the mapping for 8-antenna ports, which is shown in (C) of FIG. 1. For a case of 2-antenna ports, twenty types of mappings of the CSI-RS that are indicated by the indexes from 0 to 19 are available; and for a case of 8-antenna ports, five types of mappings of the CSI-RS that are indicated by the indexes from 0 to 4 are available. For example, by combining the index 0 for 2-antenna ports and the index 1 for 8-antenna ports among these indexes, the CSI-RS for 10-antenna ports can be obtained. Thus, the base station 20 may signal, to the mobile station, the two bits that indicate the number of the antenna ports that is 2; the index 0 in the table of FIG. 2; the two bits that indicate the number of the antenna ports that is 8; and the index 1 in the table of FIG. 2.

In this manner, by combining mappings of the CSI-RS for 1-, 2-, 4-, and 8-antenna ports, which are shown in FIG. 1, various numbers of the antenna ports can be supported.

Figure 8:
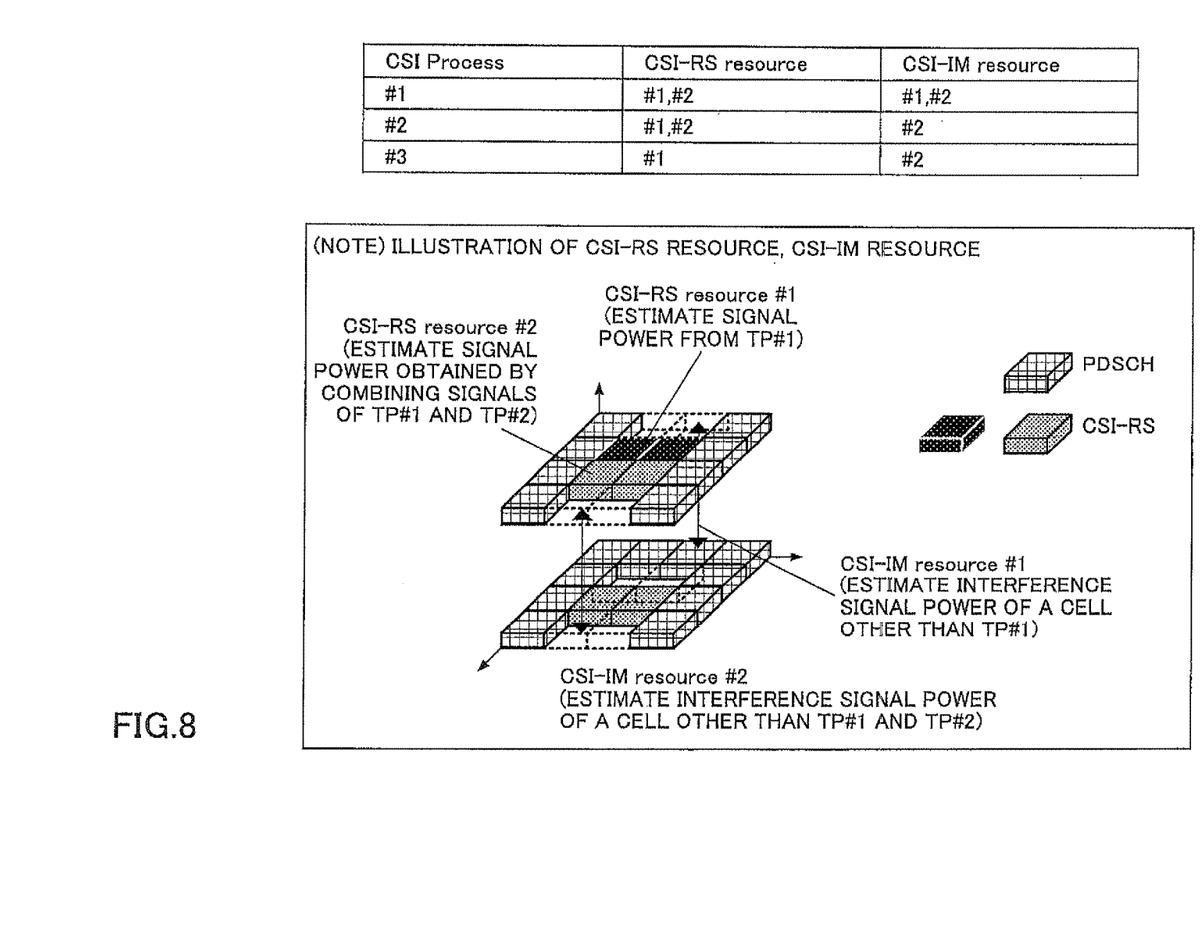
FIG. 8 shows an example of a table that is used for specifying the resource configuration of the CSI-RS.

Note that a combination of mappings of the CSI-RS for 1-, 2-, 4-, and 8-antenna ports may be signaled to the mobile station together with a CSI Process for CIS calculation. The CSI process is information indicating details of CSI feedback by a mobile station, which is defined in Release 11 of the 3GPP standard. As shown in FIG. 8, the CSI process is defined by a combination of a resource for measuring signal power (CSI-RS resource) that is used for CSI calculation, and a resource for measuring interference signals (CSI-IM (CSI-interference management) resource). The resource for measuring signal power is an index indicating a resource configuration for measuring signal power within own cell; and the resource for measuring interference signals is for a case where there is no signal in own cell, and the resource for measuring interference signals is an index indicating a resource configuration for measuring signal power in another cell. According to Release 11, for each CSI process, one resource for measuring signal power, and one resource for measuring interference signals can be specified. By specifying, for each CSI process, a plurality of resources for measuring signal power (e.g., #1 and #2) and a plurality of resources for measuring interference signals (e.g., #1 and #2), mapping for the CSI-RS for the extended number of antenna ports may be signaled to a mobile station.

The base station 20 and the mobile station 30 are configured to be the same as FIG. 6 and FIG. 7, respectively, except for the following points.

The CSI-RS mapping information storage unit 203 stores mapping information, such as shown in (A) to (C) of FIG. 1.

The CSI-RS mapping information communication unit 205 signals information indicating the mapping of the CSI-RS to a mobile station. For example, for a case of combining, for 32-antenna ports, four types of mappings of the CSI-RS that are indicated by the indexes from 0 to 3, the CSI-RS mapping information communication unit 205 may signal information indicating the number of the antenna ports that is 32, and the indexes from 0 to 3. For example, for a case of combining, for 10-antenna ports, the mapping of the CSI that is indicated by the index 0 for 2-antenna ports and the mapping of the CST that is indicated by the index 1 for 8-antenna ports, the CSI-RS mapping information communication unit 205 may signal information indicating the numbers of the antenna ports that are 2 and 8, and the indexes of 0 and 1. Additionally, the mapping information may be signaled together with the CSI process.

(3) The Method of Switching the Mapping of the CSI-RS that is Defined in Release 10 of the 3GPP Standard in Unit of Subframe or in Unit of Resource Block For this method, the radio communication system is also configured to be the same as FIG. 4. However, in order to obtain the CSI-RS for the extended number of the antenna ports, the antenna ports of the FD-MIMO station 20 are divided into a predetermined number of groups, based on a reference number of antenna ports. Then, by using, for a CSI-RS for a different group depending on a subframe or a resource block, the mapping of the CSI-RS that is defined for reference antenna ports, which are shown in FIG. 1, the mapping of the CSI-RS for the extended number of the antenna ports is generated.

Figure 9:
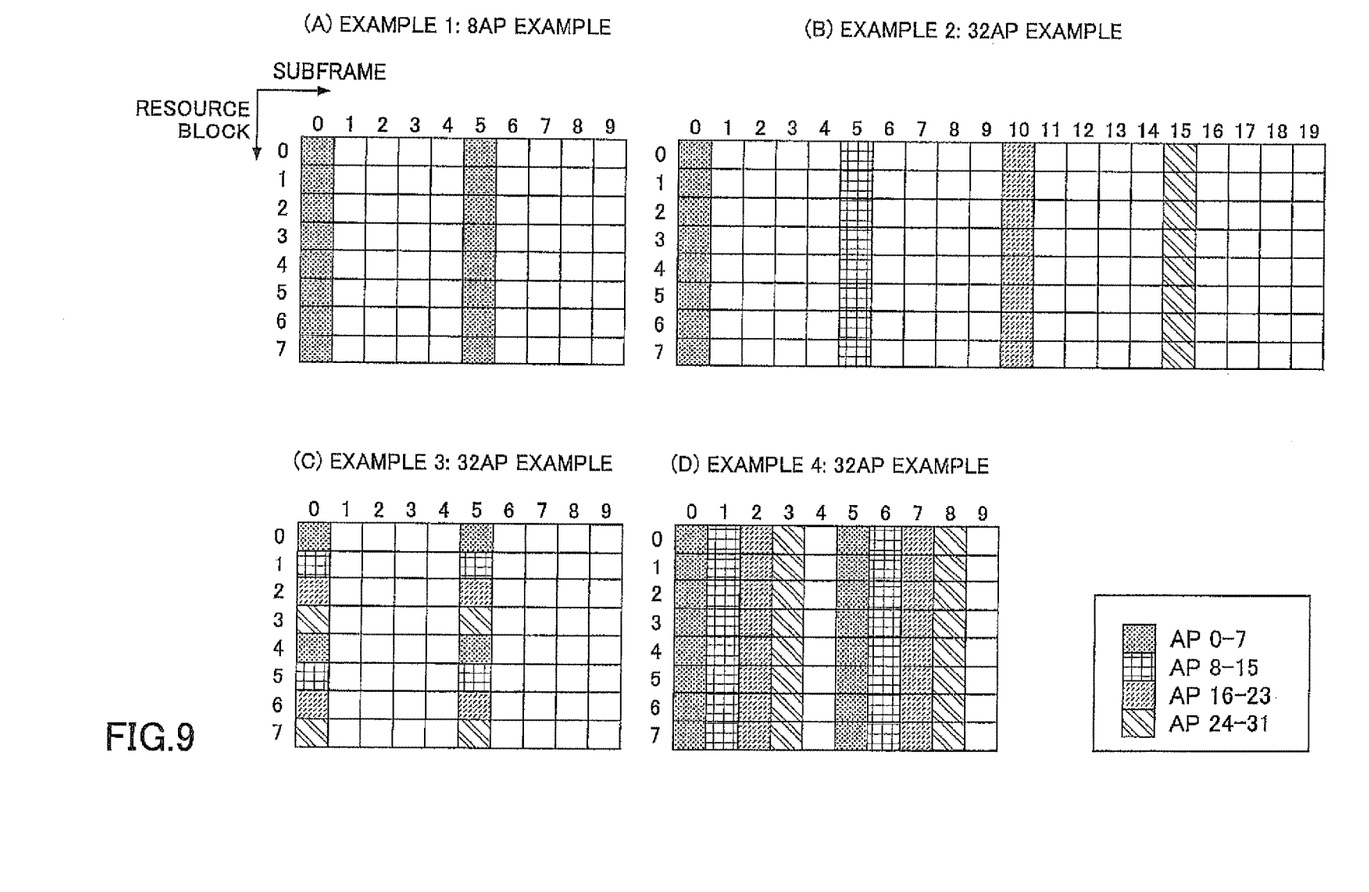
FIG. 9 shows examples of the mapping of the CSI-RS.

An example of the mapping of the CSI-RS for the case where the number of the antenna ports is 8 is shown in (A) of FIG. 9. As explained by referring to FIG. 3, the CSI-RS is transmitted at every 5, 10, 20, 40, or 80 milliseconds (subframe). A case is shown in (A) of FIG. 9 where the CSI-RS is transmitted at every 5 milliseconds.

For example, for a case where the number of the antenna ports is 32, by assuming that the reference number of the antenna ports is 8, the antenna ports can be divided into the antenna port numbers from 0 to 7; the antenna port number from 8 to 15; the antenna port numbers from 16 to 23; and the antenna port numbers from 24 to 31. By alternately using, for the four groups, the mapping of the CSI-RS for the 8-antenna ports, and by transmitting the CSI-RS with four subframes or four resource blocks, the CSI-RS for 32-antenna ports can be obtained. It may be defined on a system how to allocate the groups of the antenna ports to subframes or resource blocks. For example, as shown in (B) of FIG. 9, the CSI-RS for 32-antenna ports may be transmitted, at transmission intervals (e.g. 5-millisecond intervals) that are defined for the 8-antenna ports, in the order of the antenna port numbers from 0 to 7, the antenna port numbers from 8 to 15, the antenna port numbers from 16 to 23, and the antenna port numbers from 24 to 31. For example, as shown in (C) of FIG. 9, the CSI-RS for the 32-antenna ports may be transmitted by multiplexing the CSI-RS for the antenna port numbers from 0 to 7; the CSI-RS for the antenna port numbers from 8 to 15; the CSI-RS for the antenna port numbers from 16 to 23; the CSI-RS for the antenna port numbers from 24 to 31, in unit of frequency, at the transmission time intervals (e.g., 5-millisecond intervals) that are define for the 8-antenna ports. For example, as shown in (0) of FIG. 9, the CSI-RS for the antenna port numbers from 0 to 7 may be transmitted at the transmission interval (e.g., 5 milliseconds) that is defined for the 8-antenna ports; and the CSI-RS for the antenna port numbers from 8 to 15, the CSI-RS for the antenna port numbers from 16 to 23, and the CSI-RS for the antenna port numbers from 24 to 31 may be transmitted in this order at the same transmission time intervals. In (D) of FIG. 9, the CSI-RS for the antenna port numbers from 0 to 7, the CSI-RS for the antenna port numbers from 8 to 15, the CSI-RS for the antenna port numbers from 16 to 23, and the CSI-RS for the antenna port numbers from 24 to 31 are allocated to consecutive subframes. However, these may be allocated to subframes that are spaced by a predetermined interval.

In FIG. 9, the CSI-RS is multiplexed in the resource block by Frequency Division Multiplexing (FDM) and Time Division Multiplexing (TDM). However, the CSI-RS may be multiplexed by combining these with Code Division Multiplexing (CDM). For example, the CSI-RS for an antenna port may be code division multiplexed with the CSI-RS for another antenna port, and these may be multiplexed in a resource block that is reserved for the CSI-RS.

For example, for a case where the number of the antenna ports of the FD-MIMO station 20 is 32, an extension factor can be defined as 32/8=4, from the relationship between the number of the antenna ports (32) and the reference number of the antenna ports (8). The FD-MIMO station 20 may transmit, to the mobile station 30, the extension factor, in addition to the indexes (CSI-RS configuration) that are shown in the table of FIG. 2 (CSI-RS configuration). By the extension factor, the mobile station 30 may recognize that the mapping of the CSI-RS for the reference antenna ports is used for a group of the antenna ports that is different depending on a subframe or a resource block.

Additionally, to indicate which subframe is used for the CSI-RS, the subframe configuration that is shown in FIG. 3 may be signaled to the mobile station 30 more than once. For example, the subframe that is signaled for the first time may be used for the CSI-RS for the antenna port numbers from 0 to 7; the subframe that is signaled for the second time may be used for the CSI-RS for the antenna port numbers from 8 to 15; the subframe that is signaled for the third time may be used for the CSI-RS for the antenna port numbers from 16 to 23; and the subframe that is signaled for the fourth time may be used for the CSI-RS for the antenna port numbers from 24 to 31. Alternatively, for the mapping of the CSI-RS for the reference antenna ports, the subframe configuration that is shown in FIG. 3 may be signaled to the mobile station; and the transmission timings (offsets) for the reference antenna port numbers from 0 to 7, the antenna port numbers from 8 to 15, the antenna port numbers from 16 to 23, and the antenna port numbers from 24 to 31, respectively, may be signaled to the mobile station.

The relationship between the subframe or the resource block, in which the CSI-RS of the antenna ports are multiplexed, and the antenna ports may be explicitly signaled to the mobile station, or the relationship may follow a predetermined rule. For example, in the order of the reserved subframes or resource blocks, the CSI-RS for the antenna port numbers from 0 to 7, from 8 to 15, from 16 to 23, and from 24 to 31 may be allocated.

The base station 20 and the mobile station 30 are configured to be the same as FIG. 6 and FIG. 7, respectively, except for the following points.

The CSI-RS mapping information storage unit 203 stores mapping information, such as shown in (A) through (C) of FIG. 1.

The CSI-RS mapping information communication unit 205 signals, to a mobile station, information indicating the mapping of the CSI-RS. For example, for a case where the mapping of the CSI-RS for the reference number of the antenna ports that is 8 is to be transmitted by four subframes or four resource blocks by alternately using the CSI-RS for four groups of the antenna ports, as shown in (B) of FIG. 9 through (D) of FIG. 9, the CSI-RS mapping information communication unit 205 may signal, to a mobile station, the index (CSI reference signal configuration) that indicates the subframe configuration for the reference antenna ports, and an extension factor. Additionally, the CSI-RS mapping information communication unit 205 may signal, to a mobile station, the indexes (CSI-RS-SubframeConfig) of the table (CSI-RS subframe configuration) that is shown in FIG. 3 more than once. Alternatively, the CSI-RS mapping information communication unit 205 may signal, to a mobile station, an index (CSI-RS-SubframeConfig) that indicates a subframe configuration of the reference antenna ports, and transmission timings (offsets) from the subframe configuration of the reference antenna ports.

Note that, in the description of (3), the mapping of the CSI-RS that is defined in Release 10 of the 3GPP standard is switched in unit of subframe or in unit of resource block; however, the mapping of (1) or (2) may be switched in unit of subframe or in unit of resource block. For example, for a case where the number of the antenna ports is 32, a resource block configuration for 16-antenna ports may be generated in accordance with the method of (1) or (2); and the generated mapping of the CSI-RS for the 16-antenna ports may be transmitted by two subframes or two resource blocks by alternately using the generated mapping of the CSI-RS for the 16-antenna ports for the two groups of the antenna ports.

Note that, as the access port numbers for LTE, numbers that are greater than 15 are assigned. However, in the above-described embodiments, for convenience of the description, serial numbers from 0 are assigned.

(4) Effects of the Embodiments of the Present Invention

As described above, according to the embodiments of the present invention, configurations of the CSI-RS that can support various numbers of antenna ports can be achieved. In addition, by considering the configuration of the CSI-RS for less than or equal to 8 antenna ports, an impact on existing terminals can be reduced.

Furthermore, by combining the configurations of the CSI-RS for less than or equal to 8 antenna ports, an amount of signaling to a mobile station can be reduced.

For convenience of the description, the base station and the mobile station according to the embodiments of the present invention are described by using functional block diagrams. However, the base station and the mobile station according to the embodiments of the present invention may be implemented in hardware, software, or combinations thereof. Additionally, depending on necessity, the functional units may be combined and used.

Furthermore, the methods according to the embodiments of the present invention are described by using flowcharts that indicate flows of the processes. However, the methods according to the embodiments may be implemented in orders that are different from the orders that are shown in the embodiments.

The methods for achieving configurations of the CSI-RS that can support the extended number of the antenna ports are described above. However, the present invention is not limited to the above-described embodiments, and various modifications and applications may be made within the scope of the claims.

This international patent application is based upon and claims the benefit of priority of Japanese Patent Application No. 2013-200606 filed on Sep. 26, 2013, which is incorporated herein by references in its entirety.

LIST OF REFERENCE SYMBOLS

10: Macro base station
20: Base station (FD-MIMO station)
201: CSI-RS generator
203: CSI-RS mapping information storage unit
205: CSI-RS mapping information communication unit
207: Multiplexer
209: Transmitter
211: Receiver
213: CSI processing unit
30: Mobile station
301: Receiver
303: CSI-RS extracting unit
305: CSI generator
307: Transmitter

The invention claimed is:
1. A base station comprising:
a processor that communicates, to a mobile station, an index representing a first mapping of reference signals for measuring channel state information of a more than a predetermined number of antenna ports, the first mapping being configured by combining second mappings of the reference signals for measuring the channel state information, each of the second mappings being defined for the predetermined number or less antenna ports;

a multiplexer configured to multiplex the reference signals for measuring the channel state information in one or more resource elements in accordance with the first mapping; and a transmitter configured to transmit the reference signals for measuring the channel state information, wherein, in the one or more resource elements in which the reference signals for measuring the channel state information of the more than the predetermined number of antenna ports is multiplexed, a reference signal for measuring the channel state information of each antenna port number is mapped to a position determined in accordance with a predetermined rule.

2. A mobile station comprising:

a mapping information receiver configured to receive an index representing a first mapping of reference signals for measuring channel state information of more than a predetermined number of antenna ports, the first mapping being configured by combining second mappings of the reference signals for measuring the channel state information, each of the second mappings being defined for the predetermined number or less antenna ports;

a processor that measures the reference signals for measuring the channel state information based on the received index representing the first mapping, and that generates the channel state information; and a transmitter configured to transmit the generated channel state information, wherein, in one or more resource elements in which the reference signals for measuring the channel state information of the more than the predetermined number of antenna ports is multiplexed, a reference signal for measuring the channel state information of each antenna port number is mapped to a position determined in accordance with a predetermined rule.

3. A reference signal transmission method by a base station, the method comprising:

communicating, to a mobile station, an index representing a first mapping of reference signals for measuring channel state information of a more than a predetermined number of antenna ports, the first mapping being configured by combining second mappings of the reference signals for measuring the channel state information, each of the second mapping being defined for the predetermined number or less antenna ports;

multiplexing the reference signals for measuring the channel state information in one or more resource elements in accordance with the first mapping; and transmitting the reference signals for measuring the channel state information, wherein, in the one or more resource elements in which the reference signals for measuring the channel state information of the more than the predetermined number of antenna ports is multiplexed, a reference signal for measuring the channel state information of each antenna port number is mapped to a position determined in accordance with a predetermined rule.

4. A channel quality measurement method by a mobile station, the method comprising:

receiving an index representing a first mapping of reference signals for measuring channel state information of more than a predetermined number of antenna ports, the first mapping being configured by combining second mappings of the reference signals for measuring the channel state information, each of the second mappings being defined for the predetermined number or less antenna ports; and measuring the reference signals for measuring the channel state information based on the received index representing the first mapping, and generating channel state information, wherein, in one or more resource elements in which the reference signals for measuring the channel state information of the more than the predetermined number of antenna ports is multiplexed, a reference signal for measuring the channel state information of each antenna port number is mapped to a position determined in accordance with a predetermined rule.

* * * * *